United States Patent
Wardeberg et al.

[11] Patent Number: 6,041,282
[45] Date of Patent: Mar. 21, 2000

[54] SEISMIC CABLE AND METHOD OF MAKING THE SAME

[75] Inventors: Jørn Wardeberg, Billingstad; Anton Marius Knudsen, Son, both of Norway

[73] Assignee: Alcatel, Paris, France

[21] Appl. No.: 09/084,743

[22] Filed: May 26, 1998

[30] Foreign Application Priority Data

Jun. 9, 1997 [NO] Norway ..................................... 972635

[51] Int. Cl.⁷ ....................................................... G01V 1/16
[52] U.S. Cl. ....................................................... 702/1; 702/6
[58] Field of Search ..................... 702/14, 1, 6; 367/25

[56] References Cited

U.S. PATENT DOCUMENTS

| | | | |
|---|---|---|---|
| 3,531,760 | 9/1970 | Whitfill | 340/7 |
| 3,696,329 | 10/1972 | Hazelhurst | 340/7 |
| 3,710,006 | 1/1973 | Davis | 174/101.5 |
| 3,961,304 | 6/1976 | Bakewell, Jr. | 340/7 |
| 3,996,413 | 12/1976 | Foord et al. | 174/23 |
| 4,078,223 | 3/1978 | Strange | 340/7 R |
| 4,160,229 | 7/1979 | McGough | 340/7 |
| 4,399,322 | 8/1983 | Hafner, Jr. | 174/101.5 |
| 4,402,069 | 8/1983 | Miller et al. | 367/154 |
| 5,046,055 | 9/1991 | Ruffa | 367/154 |
| 5,265,066 | 11/1993 | Svenning | 367/20 |

FOREIGN PATENT DOCUMENTS

| | | |
|---|---|---|
| 0 170 467 A3 | 5/1986 | European Pat. Off. . |
| 0 237 616 A2 | 9/1987 | European Pat. Off. . |
| 0 560 674 A3 | 9/1993 | United Kingdom . |
| 2 300 317 | 10/1996 | United Kingdom . |
| WO 93/17354 A1 | 9/1993 | WIPO . |
| WO 93/17356 A1 | 9/1993 | WIPO . |

*Primary Examiner*—Christine K. Oda
*Assistant Examiner*—Victor J. Taylor
*Attorney, Agent, or Firm*—Ware, Fressola, Van der Sluys & Adolphson LLP

[57] ABSTRACT

The present invention relates to seismic cables (1), including a number of elongated electrical/optical elements (8) which are arranged to be interconnected with a number of seismic sensor devices (2,3,4) arranged at intervals along the cable. The sensor devices (2,3,4) are arranged within a central tube (5). The interconnections between the sensor devices (2,3,4) and the elongated elements (8) are arranged externally of the tube via at least one longitudinal slit (6) in the tube wall (5).

10 Claims, 1 Drawing Sheet

SEISMIC CABLE AND METHOD OF MAKING THE SAME

BACKGROUND OF THE INVENTION

The present invention relates to seismic cables and in particular to marine seismic cables. Some marine seismic cables include buoyancy devices —and arrays of such cables are arranged to be towed in a submerged position in the sea behind a surface vessel.

The present invention relates to seismic cables in general and in particular to seabed laid seismic cables. Such cables are arranged to be installed in arrays to cover a certain area on the sea bed. The seismic cables are designed to detect sound wave signals reflected from subsea oil and gas reservoirs when air guns are detonated in the sea.

The seismic cables include a number of sensor devices which are powered and interrogated from a surface vessel. The array of seabed seismic cables may also include electronic units for signal processing. The cables therefore also include power conductors for the electronic units and for the sensors, as well as signal conductors for interconnections and transmitting processed signals detected by the sensors to the vessel.

There will typically be about four sensor groups per 100 meters along the cable, each group containing some 4 sensors. Each sensor group is some 200 mm long.

A typical length of a seabed laid seismic cable is some 100 meters as compared to towed seismic cables having a typical length of some 300 meters. A typical diameter of a cable is some 50 mm. The density of the seabed laid cable is typically 3kg/l which is three times the typical density of a towed seismic cable.

SUMMARY OF THE INVENTION

The object of the present invention is to provide an improved seabed laid seismic cable which can be manufactured in long lengths. The main features of the invention are defined in the accompanying claims. With this invention, a type of seismic cable is obtained which is suitable for installation on the sea bed and which can be connected in arrays.

Above mentioned and other features and objects of the present invention will clearly appear from the following detailed description of embodiments of the invention taken in conjunction with the drawing

DETAILED DESCRIPTION OF THE INVENTION

Figure 1:
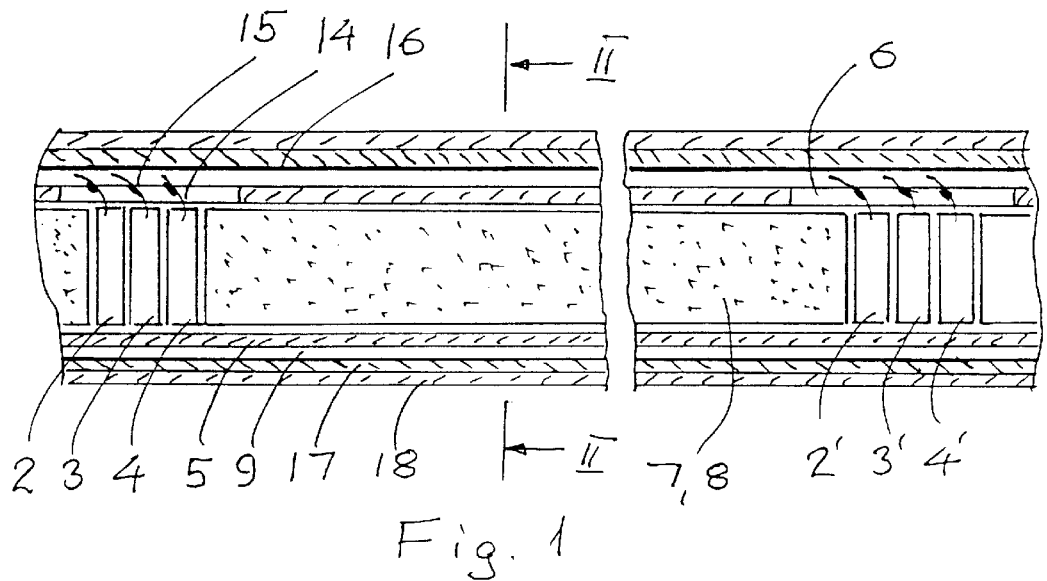
FIG. 1 schematically illustrates a side view of a cable, with portions broken away to reveal internal structure
Figure 2:
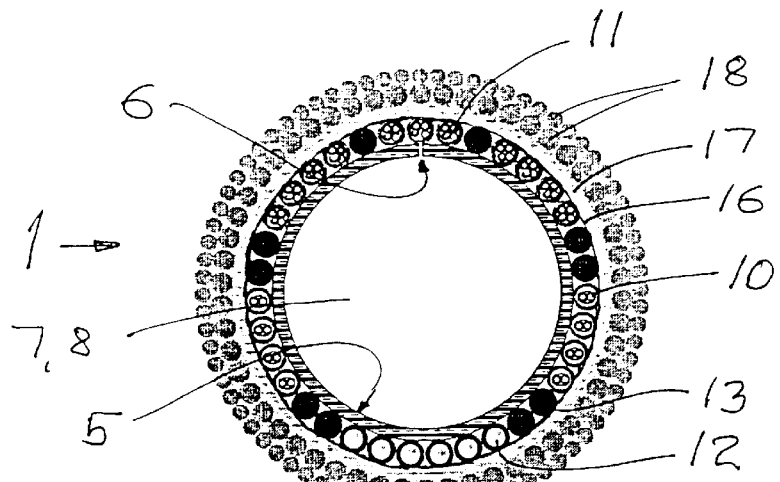
FIG. 2 is a cross sectional view of a cable.

In FIGS. 1 and 2—which are not drawn to scale—a cable 1 includes a number of sensor devices 2,3,4; 2',3',4'arranged in groups at suitable intervals along the cable. FIG. 2 illustrate a cut along line II—II in FIG. 1. The sensors are arranged within a central polyethylene tube 5 having at least one longitudinal slit 6 (FIG. 2). The inner diameter of the tube 5 should substantially equal the outer diameter of the sensor devices. The tube space 7 between the sensor groups is filled with a circular polyethylene string 8 or a suitable filler material such as petroleum jelly. Power and signal (electrical and/or optical) conductors 9 are arranged in stranded—helically or SZ-wise—fashion over the tube 5. These conductors 9—which may include pairs 10, quads 11 and other conductor elements 12 and 13—could also be arranged axially. A number of longitudinal strength elements (not shown) could be arranged underneath the tube in parallel with the cable axis.

Each of the sensors 2,3,4 is provided with conductors 14 for power and signals designated for that particular sensor. Interconnections 15 between that particular conductors 14 and the relevant cable part—or conductors—of the cable/conductor layer 9 are indicated.

The next step in the manufacturing process will be filling all interstices with a water blocking compound such as petroleum jelly, wrapping a layer 16 over the conductor layer 9 and interconnections 15, extruding a protective and sealing plastic jacket 17, such as polyethylene and finally providing armoring 18 on the cable. The armoring may be steel wires.

The polyethylene tube 5 will typically be manufactured with a circular cross section, and the slit 6 will be made in conjunction with the installation of the sensor devices within the tube. The length of the slit should be limited, as dictated by the installation technique and by the length of the sensor devices. Once one particular sensor group is placed within the tube, the connections between the sensor conductors 14 and the dedicated conductors 9 can be made by conventional soldering/crimping techniques.

Another option would be to preconnect the sensor groups to their dedicated pairs, followed by stranding. In case of optical fibers being used for signal transmission the connection will be fusion splice.

The manufacturing process may start with extrusion of the tube 5 around a longitudinal polyethylene string 8 together with a lubricating agent such as petroleum jelly. The purpose of the lubricating agent is to facilitate cutting out and removal of a suitable piece or length of the string when the tube is slit and opened to insert the sensor group 2,3,4.

When this seismic cable is made in long lengths which at a later step is to be cut into a number of discrete lengths each including a certain number of sensor groups, the armor layer has to be marked with colors or otherwise in order to facilitate cutting at suitable positions between sensor groups.

The above detailed description of embodiments of this invention must be taken as examples only and should not be considered as limitations on the scope of protection. The principles of the invention which have been described in connection with marine seabed laid seismic cables, can also be used in connection with towed seismic cables and on shore seismic cables.

What is claimed is:

1. Seismic cable comprising:
    (a) a central tube defined by a tube wall having at least one longitudinal slit therein;
    (b) a plurality of seismic sensor devices arranged at intervals within the central tube;
    (c) a plurality of elongated electrical/optical elements arranged externally of the central tube; and
    (d) interconnections between the sensor devices and the elongated elements are arranged externally of the tube via the at least one longitudinal slit in the tube wall.

2. Cable according to claim 1, wherein elongated elements are helically stranded over the tube.

3. Cable according to claim 1, wherein elongated elements are SZ-wise stranded over the tube.

4. Cable according to claim 1, wherein the tube is filled with a water repellent filling compound in areas between the sensor devices and around the sensor devices.

5. Cable according to claim 1, wherein the tube is filled with a polyethylene string in the areas between adjacent groups of the sensor devices and around the sensor devices.

6. Cable according to claim 1, wherein the elongated elements are included within a common wrapping and outer mechanical and corrosion protective sheaths.

7. Method for making a seismic cable, including the steps of:
   (a) providing a central tube defined by a tube wall having at least one longitudinal slit therein;
   (b) arranging a plurality of seismic sensor devices at intervals within the central tube;
   (c) arranging a plurality of elongated electrical/optical elements externally of the central tube; and
   (d) providing interconnections between the sensor devices and the elongated elements externally of the tube via the at least one longitudinal slit in the tube wall.

8. Method according to claim 7, wherein the central tube providing step is stopped at intervals for slitting the tube, inserting a group of the sensor devices into the tube, and providing the interconnections between the group of sensor devices and associated ones of the elongated elements.

9. Method according to claim 8, wherein the central tube providing step includes extrusion of the tube being performed around a longitudinal polyethylene string together with a lubricating agent to facilitate cutting out and removal of a suitable piece of the string when the tube is slit and opened to insert the sensors.

10. Method according to claim 8, further including the steps of filling all space and interstices in the central tube with a water repellant agent and applying outer protective layers.

* * * * *